Sept. 7, 1965          E. L. COCHRAN          3,205,432
                      CAVITY RESONATORS
                    Filed May 25, 1962
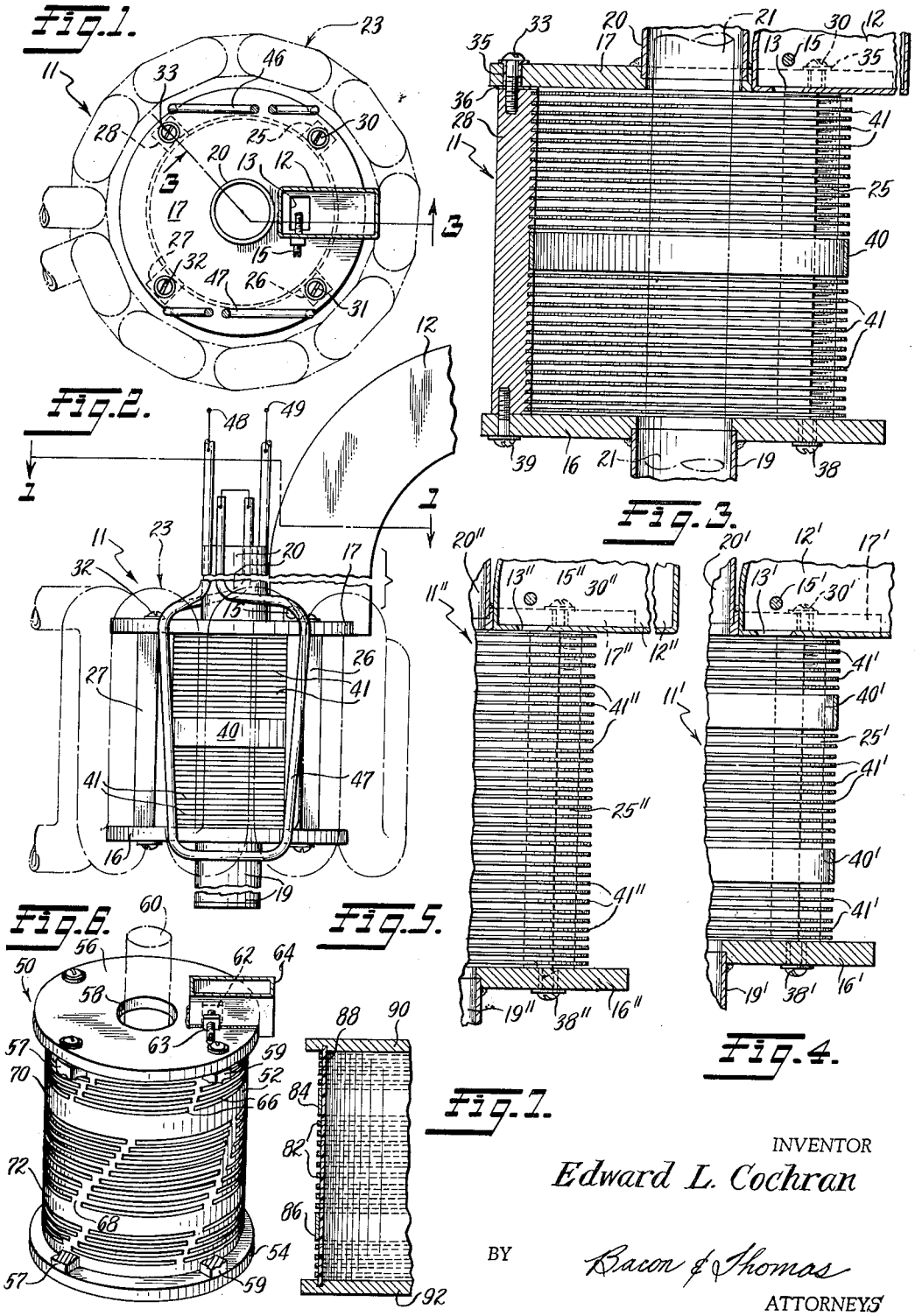
INVENTOR
Edward L. Cochran
BY  Bacon & Thomas
         ATTORNEYS

United States Patent Office 3,205,432
Patented Sept. 7, 1965

3,205,432
CAVITY RESONATORS
Edward L. Cochran, Clarksville, Md., assignor to the United States of America as represented by the Secretary of the Navy
Filed May 25, 1962, Ser. No. 197,752
7 Claims. (Cl. 324—.5)

The present invention relates to cavity resonators, and more particularly to resonators for use in applications requiring simultaneous illumination of a sample of material that is supported within the resonator by electromagnetic energy, both at the resonant frequency of the cavity and at some other frequency in the visible, ultra-violet, or infrared regions of the spectrum.

In the field of electron spin resonance spectroscopy, for example, microwave cavity resonators are being utilized for studying samples of paramagnetic materials which are supported within the resonator. In certain instances, it is necessary to illuminate a sample by light from a visible, ultra-violet or infrared source of light that is mounted externally of the resonator. Within the resonator, it often is necessary to provide a D.C. magnetic field that is modulated by a pair of Helmholtz coils, for example.

Openings must be provided through a wall or the walls of the resonator for passing radiation from the light source to the sample. This is achieved by providing slits in one of the resonator walls. With constructions used previously, it has been impossible to pass enough light into the resonator for satisfying the requirements of many applications without adversely affecting the electrical properties of the cavity.

Moreover, in many applications it is desirable to modulate the D.C. magnetic field in the resonator at high frequencies. At such high frequencies, eddy currents in the metal walls of the resonator may produce excessive losses. This can be partially overcome by using various specialized designs, all of which have serious drawbacks.

Therefore, it is an object of the present invention to provide a microwave cavity resonator that will pass a maximum amount of light through the walls of the resonator to a sample of material within the resonator.

Another object is to provide a cavity resonator into which a D.C. magnetic field that is modulated at a high frequency can be introduced with a minimum of eddy current losses.

A further object is to provide a resonator that has a relatively high Q (quality factor), with the resonator being adapted to pass a maximum amount of light through its walls to a sample of material supported therein.

Still another object is to provide an electrically efficient microwave cavity resonator that will admit a relatively large amount of light from a source that is mounted externally of the resonator, the resonator being relatively easy and inexpensive to manufacture.

Other objects and advantages of the invention will become more apparent from the following detailed description and the accompanying drawings wherein:

FIG. 1 is an end view of a cavity resonator and a light source for illuminating a sample of material within the resonator; this view being taken along the line 1—1 of FIG. 2;

FIG. 2 is a side elevational view of the cavity resonator and the light source, and shows one of the wide walls of part of an input wave guide for energizing the resonator;

FIG. 3 is an enlarged, fragmentary, vertical sectional view taken along the line 3—3 in FIG. 1, and shows a first embodiment of the resonator.

FIG. 4 is a fragmentary, vertical sectional view of part of a second embodiment of the resonator;

FIG. 5 is a fragmentary, vertical sectional view of part of a third embodiment of the resonator;

FIG. 6 is a perspective view of a fourth embodiment of the resonator; and

FIG. 7 is a fragmentary, vertical sectional view of part of a fifth embodiment of a resonator in accordance with the present invention.

Referring to FIGS. 1-3, the number 11 refers generally to a cavity resonator that has a cylindrical configuration and is adapted to be resonant either in the $TE_{011}$ or $TE_{012}$ modes. In these modes, the direction of the electric field E is transverse the axis of the resonator and the component of the electric field which extends lengthwise along the axis of the resonator is zero. The first of the numerical subscrips for the letters TE indicates the number of whole-period variations of E that occurs on a concentric circular path inside the resonator. The second numerical subscript indicates the number of half-period variations of E that occurs along a radius of the resonator. The third numerical subscript indicates the number of half-period variations of E that occurs along the axis of the resonator.

Microwave energy is supplied to the resonator 11 by a rectangular wave guide 12, which is coupled to the resonator 11 by a rectangularly shaped, tuned iris 13 provided in an end plate of the wave guide. The orientation of the rectangular iris 13 is shown in FIG. 1. The iris 13 preferably lies midway or nearly midway between the axis of the resonator 11 and the outer edge of the resonator, as is shown in FIG. 1.

An adjustable tuning screw 15 is provided for adjusting the impedance of the iris 13, thus altering the coupling of the cavity resonator 11 to the input wave guide 12. The tuning screw 15 is threaded through one of the wide walls of the wave guide 12. The axis of the screw 15 is parallel with the longer dimension of the iris 13, is adjacent the plane of the iris 13, and is substantially midway between the longest sides of the iris 13.

Supported within apertures provided in opposite end walls 16 and 17 of the resonator 11, a pair of cylindrical tubes 19 and 20 are provided along the axis of the resonator. The diameters of these tubes should be less than cut-off at the frequency of resonator 11 to prevent leakage of microwave energy from the resonator 11. The tubes 19 and 20 act as a support for a quartz tube 21 for receiving a sample of the material to be studied. This material might be a solid, a liquid or a gas. This sample of material is to be exposed simultaneously to microwave energy within the resonator 11 and light from a source 23 mounted externally of the resonator.

The light source 23 is supported around the resonator 11 for illuminating the sample of material within tube 21. The light source preferably has a configuration generally as illustrated, is constructed from quartz tubing, and may be a neon lamp. The resonator 11, the light source 23, and the sample within tube 21 are part of an apparatus for making photolytic studies of a material.

One example of such an apparatus is an instrument known as a microwave spin resonance spectrometer. In such an instrument, the cavity resonator is supported between the poles of an electromagnet, not shown, with the magnetic lines of force between the poles extending in a direction that is at right angles with the longitudinal axis of the resonator. A pair of Helmholtz coils 46 and 47 are provided for modulating the D.C. magnetic field applied to the resonator by the electromagnet. The coils 46 and 47 are connected in series between terminals 48 and 49 of a source of sine wave alternating voltage at 100 kilocycles, for example. The resonator 11 is adapted to be resonant at a frequency of approximately 9,000 megacycles per second, for example. The field produced by the electromagnet may be varied from 3,000–5,000 gausses, for example.

The resonator end walls 16 and 17 are made from copper, for example. Spaced around the axis of the resonator, four grooved struts 25–28, respectively, are supported between the end walls 16 and 17. As illustrated, the struts 25–28 are made from a conductive material which might be brass, for example. Instead, the struts 25–28 could be made of an insulating material, such as Bakelite.

The end wall 17 is attached to the ends of struts 25–28 by four metal screws 30–33, respectively. Dielectric washers, such as 35 and 36, are provided with each of screws 30–33, respectively, for insulating the screws from the resonator end wall 17 and for insulating the resonator end wall 17 from the support struts 25–28. This is done for minimizing hysteresis or eddy current losses that are induced by the Helmholtz coils 46 and 47.

The end wall 16 is attached to the ends of the support struts 25–28 by four screws. Two of these screws are shown by 38 and 39 in FIG. 3.

Supported by a groove at the center of the struts 25–28 at a region that is spaced equally from the resonator end walls 16 and 17, a cylindrical band 40 is provided. Also supported by grooves in the struts 25–28 on opposite sides of the band 40, a plurality of cylindrical bands 41 are provided. The bands 41 and the band 40 are spaced apart to provide a plurality of openings therebetween for admitting light into the resonator. The bands 41 are considerably narrower in width than the band 40. The bands 40 and 41 are made from a material such as brass, are turned from a tubing on a lathe, and are copper plated before being fitted into the grooves in the struts 25–28, for example.

In one actual embodiment of the resonator 11, the width of the band 40 is 0.025 inch, the width of the bands 41 is 0.012 inch, and the bands are spaced 0.033 inch apart. The spacing between each of the resonator end walls 16 and 17 and the band 41 closest thereto is 0.020 inch. The thickness of the bands 40 and 41 is 0.030 inch.

It is preferred to operate the resonator 11 in a $TE_{011}$ mode. In this mode, the resonator is one-half wavelength long and the distribution of the electric field vectors is such that the intensity of the electric field is maximum at the center of the resonator and minimum at the end walls 16 and 17. Thus, the center of the band 40 is one-quarter wavelength or $\lambda/4$ from each resonator end wall and is at a region of maximum electric field intensity, and the slots or spaces between the bands 41 are at regions of lesser electric field intensity. This distribution helps to reduce resistive or $E^2/R$ losses in the resonator walls, and minimizes radiation losses. In one actual embodiment of the invention, the Q of the resonator shown in FIGS. 1–3 is approximately 15,300 for operation of the resonator 11 in the $TE_{011}$ mode. The resonator 11 can be operated in the $TE_{012}$ mode, but the Q will be lower.

A slightly different embodiment of the resonator is illustrated in FIG. 4. In this embodiment, the resonator 11 and the input wave guide assembly is similar to the apparatus shown in FIG. 3, with similar parts being referred to by primed numbers. In FIG. 4, however, the resonator 11' is adapted to be operated preferably in the $TE_{012}$ mode. In this mode, there are two regions of maximum electric field intensity spaced one-quarter wavelength or $\lambda/4$ from the resonator end walls. The centers of two wide bands 40' and 40' are located at these regions of maximum electric field intensity, respectively. The narrow bands 41' are at regions of lesser electric field intensity. The spacing between the bands is similar to the spacing between the bands in the embodiment of FIG. 3 to provide a plurality of light-admitting openings through the resonator side wall.

Still another embodiment of the resonator is shown in FIG. 5. This embodiment consists of a plurality of bands 41" that are spaced apart by a constant distance to form light-admitting openings between the bands. The Q of this resonator, shown in FIG. 5, is less than the Q for the resonators shown in FIG. 3 and FIG. 4 under similar operating conditions, i.e., comparing operation of the resonators shown by FIG. 3 and FIG. 5 for the $TE_{011}$ mode, and comparing operation of the resonators shown by FIG. 4 and FIG. 5 for the $TE_{012}$ mode.

In the embodiment of the invention shown in FIG. 3, the transmission of light through the walls of the cavity resonator 11 is approximately forty-six percent. Thus, the sample of material within tube 21 is well illuminated by the light source 23, and is exposed to light over a 360° angle.

A slightly different embodiment of the microwave cavity is shown in FIG. 6. A cylindrical cavity resonator 50 includes a cylindrical shell 52 of highly conductive material such as copper, a bottom conductive plate or end wall 54, and a top conductive plate or end wall 56. Four rods, two of which are shown at 57 and 59, are supported between the end walls 54 and 56 for supporting the shell 52. These rods and the shell 52 should be insulated from the end wall 56 to minimize eddy current losses.

The end wall 56 has a central opening 58 and a below cut-off tube 60 extending therefrom for permitting the material to be studied to be introduced into the resonator. The end wall 56 also has a rectangular opening or coupling iris 62 and a tuning screw 63 for supplying microwave energy to the cavity resonator 50 from a rectangular wave guide 64. Any other suitable means for exciting the resonator might be employed instead of wave guide 64 and iris 62.

The cylindrical shell 52 is provided with a plurality of openings, such as circumferentially-extending slits 66 (the number being reduced from the number that actually exists in a physical embodiment of the resonator). Each slit extends about a substantial portion of the shell 52. About the circumference of the shell 52 at four points, for example, short sections 68 of material are uncut to provide structural support for the wall. The sections 68 preferably are circumferentially staggered relative to each other so that they do not lie in a straight line. Thus, light that is passed through the walls of the shell 52 from a light source, not shown, is more uniformly distributed than it would be if a straight line array of sections 68 were present. Moreover, the structural support of the slitted cavity resonator is distributed more evenly.

The resonator 50 is adapted to be resonant to microwave energy preferably in a $TE_{012}$ mode. Each of the unslitted bands 70 and 72 of the cylindrical wall of the resonator 50 is at a region where the intensity of the electrical field in the resonator is at a maximum. The slits 66 are concentrated in regions where the intensity of the electrical field is less than maximum. This distribution helps to reduce resistive $E^2/R$ losses in the resonator walls, and minimizes radiation losses.

To illustrate the size and distribution of the slits 66 in the wall of the resonator, assume a cylindrical shell that is 2.044 inches in length for operation in the $TE_{012}$ mode. The shell 52 has an unslit band 0.060 inch in width at the ends of the shell, for structural reasons. The unslit bands 70 and 72 are 0.254 inch in width. The area of the surface of the shell 52 between the bands 70 and 72 has twenty-five evenly spaced circumferential slits therein. The regions between the bands 70 and 72 and the unslit bands at the upper and lower ends of the resonator shell has 10 slits. Thus, a total of forty-five slits are used, each being 0.011 inch wide.

It has been found that the unloaded Q of the resonator described immediately above is about 12,000, for $TE_{012}$ mode operation, and that approximately 30 percent of the surface area of the cylindrical shell 52 is open for the passage of light radiation into the cavity of the resonator from a suitable source, not shown. This light source would be similar to the one shown in FIG. 1 and FIG. 2, for example. It is apparent that light radiation will pass through the shell 52 and illuminate almost the entire surface of the sample 60 over a fully 360 degrees.

The thickness of the wall of the shell 52 is small, and typically is about 0.020 inch. In constructing the resonator, the shell 52 first is cut to a desired length and filled with a low melting point metal, such as Woods metal. The slits 66 are made by passing a saw transversely into the cylinder at the desired points. After the slits have been cut in this manner, the filler metal is melted out, and the cylindrical shell is completed.

The slits 66 are all shown to lie circumferentially about the shell 52. While other positions are possible, care must be taken that the slits are not positioned to create discontinuities which would disrupt the current flow in the walls of the shell. The currents for the $TE_{012}$ mode travel circumferentially about the shell, and a similar position for the slits 66 is desirable.

Still another embodiment of the resonator is shown in FIG. 7. In this embodiment, silver rings 82 of relative small width, and silver bands 84 and 86 of larger width, are deposited on a quartz tube 88, after first masking the areas to be left unmetallized. The tube 88 is supported between two conductive end walls 90 and 92, to form a resonator that has a high degree of rigidity. The rings 82 and the bands 84 and 86 form a slotted cylindrical resonator wall that has a slot configuration similar to that in FIG. 4. Operation preferably is in the $TE_{012}$ mode.

In using each of the above-described resonators for electron spin resonance spectroscopy applications, for example, the D.C. magnetic field is applied to the sample of material by an adjustable electromagnet, not shown. The D.C. magnetic field is modulated at an audio frequency by means of the Helmholtz coils 46 and 47. This is done to modulate the microwave absorption so that the resulting signal can be amplified. For many purposes, it is desirable to modulate the field at high frequencies, for example, 100 kc.

Heretofore, the modulation has resulted in excessive losses caused by eddy currents in the metal walls of the resonator, resulting in mechanical modulation of the cavity, heating effects, etc. This may be lessened to some degree by constructing the side walls of the cavity of metallized ceramic. However, this is an expensive process, and it results in a massive, yet fragile structure that is subject to damage by abrasion and corrosion. Other means used heretofore to minimize eddy current losses have similar serious drawbacks.

In the embodiments of the resonators shown in FIG. 3, FIG. 4 and FIG. 5, eddy currents are minimized if the cylindrical bands 41, 41' and 41" are insulated from each other, and the struts for supporting the bands are insulated from one end wall in each resonator. If the struts 25–28 are made from metal, the cylindrical bands are insulated from each other by coating the struts 25–28 with formvar or some other suitable insulator. Instead, the struts might be made of plastic, ceramic, or other insulating material. The struts 25–28, if made from metal, are insulated from each resonator end wall 17, 17' and 17" by using flat insulating washers, as are shown in FIG. 3 by numeral 36. If the screws 30–33 are made from metal, the insulating washers 35, as are shown in FIG. 3, should be employed. Instead, the screws 30–33 could be made from plastic.

In the resonator structure shown in FIG. 6, eddy currents also are minimized, but not as well as they are minimized in the structures shown in FIGS. 1–5. In the structure shown in FIG. 7, the eddy current problem is negligible.

It is apparent that many changes could be made in the above invention and that different words of description might be used without departing from the scope of the invention. Therefore, it is to be understood that the invention is limited solely by the following claims.

What is claimed is:

1. A microwave cavity resonator comprising
   a wave-supporting cylindrical side wall area;
   a pair of end walls fastened together at the extremities of the side wall to form a hollow cavity resonator;
   means in one end wall for energizing the resonator in the $TE_{011}$ mode of resonance;
   said side wall area comprising a plurality of continuous, narrow, uncut, conductive band portions spaced apart to form a plurality of non-conductive openings between said uncut portions for passing light into the resonator, said openings extending over an area at least as great as one-quarter that of the total side wall area; and
   a wider, conductive-band, uncut portion in the side wall located a quarter wavelength from each end wall so as to coincide with a plane through the region of maximum electric field in the resonator, whereby radiation losses and resonator wall losses are substantially reduced.

2. The microwave cavity resonator of claim 1 wherein the narrow, uncut, conductive band portions of the side wall are arranged in two groups so that each group coincides with a plane through a region of minimum electric field in the resonator.

3. A microwave cavity resonator comprising
   a wave-supporting cylindrical side wall area;
   a pair of end walls fastened together at the extremities of the side wall to form a hollow cavity resonator;
   means in one end wall for energizing the resonator in the $TE_{012}$ mode of resonance;
   said side wall area comprising a plurality of continuous, narrow, uncut, conductive-band portions spaced apart to form a plurality of non-conductive openings between said uncut portions for passing light into the resonator, said openings extending over an area at least as great as one quarter that of the total side wall area; and
   a plurality of wider conductive-band, uncut portions in the side wall, one located a quarter wave-length from each end wall, and each wide uncut portion coinciding with a plane through a region of maximum electric field in the resonator, whereby radiation losses and resonator wall losses are substantially reduced.

4. The microwave cavity resonator of claim 3 wherein the narrow, uncut, conductive-band portions of the side wall are arranged into three groups, each of the groups coinciding with a plane through a region of minimum electric field in the resonator.

5. The microwave cavity resonator of claim 3 wherein each of the plurality of openings extends circumferentially around a portion of the side wall before encountering an uncut portion, the successive uncut portions presenting a staggered position from the line immediately proceeding and following it.

6. A microwave cavity resonator comprising
   a pair of end walls;
   a wave-supporting side wall area located between the end walls to form a hollow cavity resonator, said side wall area being formed by a plurality of stacked cylindrical conductive bands, the spacing between the conductive bands defining a plurality of non-conductive openings for admitting light into the resonant cavity;
   means in one end wall for exciting said resonator in the $TE_{011}$ mode of resonance;
   a plurality of rods supported between the end walls and disposed along the outer edges of the cylindrical conductive bands, said rods being electrically insulated from the end walls and the conductive bands;
   a plurality of radial notches in said rods for holding the cylindrical conductive bands in place; and
   a wide, conductive, continuous, uncut band forming a portion of the side wall area located a quarter wavelength from each end wall so as to coincide with a plane through the region of maximum electric field in the resonator, whereby radiation losses and resonator wall losses are substantially reduced.

7. The microwave cavity resonator of claim 6 wherein the plurality of non-conductive openings are concentrated in two groups, each group being located to coincide with a plane passing through the region of minimum electric field in the resonator.

References Cited by the Examiner

UNITED STATES PATENTS

| | | | |
|---|---|---|---|
| 2,500,417 | 3/50 | Kinzer | 333—83 |
| 2,851,652 | 9/58 | Dicke | 330—4 |
| 2,863,998 | 12/58 | Marie | 330—4 |
| 2,884,524 | 4/59 | Dicke. | |
| 3,122,703 | 2/64 | Rempel et al. | 324—0.5 |

OTHER REFERENCES

Feher: Physical Review, vol. 114, No. 5, June 1, 1959, pp. 1219, 1244, page 1224 principally relied upon.

Reich et al.: Microwave Theory and Techniques, D. Van Nostrand Co., Inc., New York 1953, pages 249–252, page 265 and page 488 relied on.

Wittke: Proceedings of the I.R.E., March 1957, pp. 291 to 316, page 314 principally relied on.

CHESTER L. JUSTUS, *Primary Examiner*.

KATHLEEN H. CLAFFY, MAYNARD R. WILBUR, *Examiners*.